(12) United States Patent
Mochizuki et al.

(10) Patent No.: US 6,511,755 B1
(45) Date of Patent: Jan. 28, 2003

(54) POLYPROPYLENE FILM AND MULTILAYERED POLYPROPYLENE FILM

(75) Inventors: Yasuhiro Mochizuki, Chiba (JP); Yoshitaka Morimoto, Chiba (JP); Takanori Nakashima, Chiba (JP); Taketo Hirose, Chiba (JP); Takayuki Hattori, Chiba (JP); Sinichi Akitaya, Chiba (JP); Youichi Kugimiya, Chiba (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/762,711

(22) PCT Filed: Aug. 12, 1999

(86) PCT No.: PCT/JP99/04366
§ 371 (c)(1),
(2), (4) Date: Feb. 12, 2001

(87) PCT Pub. No.: WO00/11079
PCT Pub. Date: Mar. 2, 2000

(30) Foreign Application Priority Data

Aug. 21, 1998 (JP) .............................. 10-235364
Aug. 24, 1998 (JP) .............................. 10-237012
Aug. 31, 1998 (JP) .............................. 10-245607

(51) Int. Cl.$^7$ .................. B32B 27/32; C08L 23/14; C08L 23/16; C08J 5/18

(52) U.S. Cl. ................. 428/516; 428/213; 428/515; 428/523; 525/88; 525/89; 525/240

(58) Field of Search .................. 428/515, 516, 428/523, 213; 525/88, 89, 240

(56) References Cited

U.S. PATENT DOCUMENTS 4,410,582 A * 10/1983 Tsunashima et al. ......... 428/212
6,033,775 A * 3/2000 Hayashida et al. ......... 428/349

* cited by examiner

*Primary Examiner*—D. S. Nakarani
(74) *Attorney, Agent, or Firm*—Fay, Sharpe, Fagan, Minnich & McKee, LLP

(57) ABSTRACT

The present invention relates to a film using a polypropylene composition comprising crystalline polypropylene and a copolymer of propylene with α-olefin in which a limiting viscosity of the said copolymer $[\eta]_{RC}$ is not more than 6.5 dl/g; the ratio of the limiting viscosity of the said polymer $[\eta]_{RC}$ to the limiting viscosity of the said crystalline polypropylene $[\eta]_{PP}$ is from 0.6 to 1.2; and the product i.e. $([\eta]_{RC}/[\eta]_{PP}) \times (W_{PP}/W_{RC})$, of the ratio of the limiting viscosity of the copolymer to the crystalline polypropylene with the ratio by weight of them is within a range of from 0.2 to 4.5 and also relates to a multi-layered film having at least one layer of the said film.

11 Claims, 1 Drawing Sheet

POLYPROPYLENE FILM AND MULTILAYERED POLYPROPYLENE FILM

TECHNICAL FIELD

This invention relates to a polypropylene film, multi-layered polypropylene film, a self-tacky film, a multi-layered self-tacky film and multi-layered polypropylene film for a high-temperature sterilization packing. More particularly, this invention relates to a film having excellent transparency, impact resistance at low temperature and heat sealing property and also having excellent property of little whitening property upon bending and property of preventing the deterioration of transparency after heating; to a multi-layered film having excellent transparency, impact resistance at low temperature and heat sealing property and also having excellent property of little whitening property upon bending and property of preventing the deterioration of transparency after heating; to a self-tacky film having excellent transparency, impact resistance at low temperature and heat sealing property; a self-tacky multi-layered film having excellent transparency, impact resistance at low temperature and heat sealing property; and a multi-layered polypropylene film having little deterioration of transparency after a high-temperature sterilizing treatment, having excellent heat resistance, impact resistance at low temperature and tight sealing of the content and being suitable for a high-temperature sterilizing treatment packing for food.

BACKGROUND OF THE INVENTION

Polypropylene has mechanical, optical and thermal characteristics and is excellent in a packing aptitude and, therefore, it has been widely utilized in the use for packing of food and in the use for daily necessities.

With regard to a polypropylene material for polypropylene film, a propylene homopolymer, a copolymer or a terpolymer of propylene with α-olefin and a composition comprising a propylene homopolymer and a copolymer of propylene with ethylene (the so-called block copolymer) are used and each of them is used for a packing use meeting with each characteristic.

However, the conventional known polypropylene film is insufficient in terms of a balance of transparency, impact resistance at low temperature, heat sealing property, self-tackiness, little whitening property upon bending and effect of preventing the lowering of transparency after heating. Thus, there are problems that, in the film of a propylene homopolymer, impact resistance at low temperature, heat sealing property and self tackiness are poor and, in addition, little whitening property upon bending is insufficient; in the film using a copolymer or a terpolymer of propylene with α-olefin, transparency and heat sealing property are excellent but impact resistance at low temperature, self-tackiness, little wh itening property upon bending and an effect of preventing the lowering of transparency after heating are poor; and, in the film using a polypropylene composition comprising crystalline polypropylene which does not satisfy the specific limiting viscosity ratio, weight ratio, etc. and a copolymer of propylene with α-olefin, impact resistance at low temperature is excellent but transparency, heat sealing property, self-tackiness and little whitening property upon bending are poor and, in addition, f ish eye is apt to be generated.

In such a film using the conveational polypropylene, it is difficult to satisfy all of the requirements for transparency, impact resistance at low temperature, heat sealing property, self-tackiness, little whitening property upon bending and an effect of preventing the lowering of transparency after heating treatment.

In addition, as a result of development of distribution mechanism and improvement in freeze transportation technique, there has been a quick increase in food product where cooked food or processed food is packed, sterilized with steam at high temperature and distributed at ambient temperature or in a warmed or frozen state. As to a film used for sterilization by steam (hereinafter, referred to as "film for retort pouch"), the film which is made of polyolefin has been used and, with an object of prevention of generation of deformation (wrinkles, shrinking, etc.) and fusion of the film at the steam sterilization temperature (120° C. or higher but lower than 140° C.) or prevention of breakage of the film for retort pouch during the distribution at low temperature, a film using a crystalline propylene-ethylene block copolymer having excellent heat resistance and impact resistance at low temperature is used as polyolefin. However, the film using a crystalline propylene-ethylene block copolymerhas a poor transparency and there is a disadvantage that the content therein cannot be seen. When transparency is needed for the packing material with an object of seeing the content, a polyolefin film in which a crystalline propylene random copolymer is compounded with a non-crystalline ethylene-propylene copolymer is used. However, in a film where a crystalline propylene random copolymer is compounded with a non-crystalline ethylene-propylene copolymer, there are disadvantages that the transparency lowers after steam sterilization and that fusion occurs during the steam sterilization at high temperature. Recently, film for retort pouch having a transparency by the use of a linear low-density polyethylene is developed but, even in the said film, there is a problem that the film is deformed or fused upon steam sterilization. Under such circumstances, with an object of making the lowering of transparency after a high-temperature sterilization treatment little and of improving the heat resistance and the impact resistance at low temperature, there is a proposal for a compounded film where (i) the first layer comprising polypropylene or an ethylene-propylene random copolymer, (ii) the second layer comprising an ethylene-propylene block copolymer or a blend of an ethylene-propylene block copolymer with a polyolefin polymer well compatible with rubber components in the said block copolymer and (iii) the third layer comprising polypropylene or an ethylene-propylene random copolymer are layered (Japanese Patent Laid-Open No. 3950/1987).

In the meanwhile, the present applicant already filed a Japanese Patent Application No. 181,141/1996 (International Laid-Open WO 97/19135) for a multi-layered film comprising a layer using a propylene block copolymer where a limiting viscosity is within a specific range and a layer using polypropylene having well-balanced heat resistance, impact resistance at low temperature, tear strength, transparency, appearance and heat sealing property.

The present invention is to provide a film having excellent transparency, impact resistance at low temperature, heat sealingproperty and self-tackiness and also having little whitening property upon bending and an effect of preventing the lowering of transparency after heating treatment and also to provide a multi-layered film having excellent transparency, impact resistance at low temperature, heat sealing property and self-tackiness and also having little whitening property upon bending and an effect of preventing the lowering of transparency after heating treatment. Further, from the above-mentioned characteristics, the present invention is to provide a polypropylene film and multi-layered film which can be appropriately used in various uses such as a film for retort pouch to be sterilized by heating, a film for medical use, a film for layered bag package and a film for the manufacture of boxes.

DISCLOSURE OF THE INVENTION

The present inventors have carried out an intensive investigation for preparing a film which satisfies all of transparency, impact resistance at low temperature, heat sealing property, self-tackiness, little whitening property upon bending and an effect of preventing the lowering of transparency after heating treatment. As a result, it has been found that a polypropylene composition comprising crystalline polypropylene and a copolymer of propylene with α-olefin in which a limiting viscosity of the copolymer, a limiting viscosity ratio of both crystalline polypropylene and copolymer components and a product of the limiting viscosity ratio with the ratio by weight of the both components are within a predetermined range is made into a film, the resulting film has excellent transparency, impact resistance at low temperature, heating sealing property and self-tackiness and having little whitening property upon bending and an effect of preventing the lowering of transparency after heating treatment. They have further carried out an intensive investigation to prepare a film for retort pouch in which a lowering of transparency after subjecting to a high-temperature sterilization treatment is little and heat resistance, impact resistance at low temperature and a tight sealing of the content are improved. As a result, it has been found that a multi-layered film comprising three layers wherein a propylene block copolymer composition where a limiting viscosity is within a specific range is used as a core layer while a propylene polymer where the melting point of crystals is from 145° C. to 165° C. is used as a skin layer is able to solve the disadvantage of the above-mentioned film for retort pouch and, based upon such findings, the present invention has been accomplished.

The present invention is as follows.

(1) A film using a polypropylene composition comprising crystalline polypropylene and a copolymer of propylene with α-olefin in which a limiting viscosity of the said copolymer $[\eta]_{RC}$ is not more than 6.5 dl/g; the ratio ($[\eta]_{RC}/[\eta]_{PP}$) of the limiting viscosity of the said polymer $[\eta]_{RC}$ to the limiting viscosity of the said crystalline polypropylene $[\eta]_{PP}$ is from 0.6 to 1.2; and the product, i.e. ($[\eta]_{RC}/[\eta]_{PP}$)× ($W_{PP}/W_{RC}$), of the ratio by weight ($W_{PP}/W_{RC}$) of the said crystalline polypropylene to the said copolymer is within a range of from 0.2 to 4.5 where the weight of the crystalline propylene is $W_{PP}$ and that of the said copolymer is $W_{RC}$ with the said limiting viscosity ratio ($[\eta]_{RC}/[\eta]_{PP}$).

(2) The film according to the above (1), wherein the crystalline polypropylene is a propylene-α-olefin copolymer containing 90% by weight or more but less than 98.5% by weight or more than 99.5% by weight but less than 100% by weight of propylene.

(3) The film according to the above (1), wherein the copolymer is a copolymer of propylene with α-olefin containing from 25 to 55% by weight of α-olefin.

(4) The film according to the above (1), wherein the crystalline polypropylene is a propylene-ethylene copolymer containing 90% by weight or more but less than 98.5% by weight or more than 99.5% by weight but less than 100% by weight of propylene.

(5) The film according to the above (1), wherein the copolymer is a copolymer of propylene with ethylene containing from 25 to 45% by weight of ethylene.

(6) A multi-layered film having at least one layer of a film layer using the polypropylene composition mentioned in the above (1).

(7) A self-tacky multi-layered film having at least one layer of the film mentioned in the above (1) at the skin layer.

(8) A polypropylene multi-layered film for a high-temperature sterilization package consisting of a three-layered structure in which a film layer using the propylene composition mentioned in (1) is a core layer and a film comprising a propylene homopolymer having a crystal melting point of from 160° C. to 165° C. or a propylene-α-olefin copolymer having a crystal melting point of from 145° C. to 160° C. as both skin layers.

(9) The polypropylene multi-layered film for a high-temperature sterilization package according to the above (8), wherein the thickness of the core layer of the polypropylene multi-layered film for a high-temperature sterilization package mentioned in the above (8) is from 20% to 80% of the total thickness of the said polypropylene multi-layerd film.

(10) The polypropylene multi-layered film for a high-temperature sterilization package according to the above (8), wherein the melt flow rate: MFR/film (at 230° C.) of the polypropylene multi-layered film for a high-temperature sterilization package is within a range of from 0.5 g to 5.0 g/10 minutes.

(11) The polypropylene multi-layered film for a high-temperature sterilization package according to the above (8) f wherein the differencebetweenthehazevalue (HAZE/after) of the polypropylene multi-layered film after subjecting to a steam high-temperature sterilization treatment of 120° C. or higher but lower than 140° C. to the haze value (HAZE/before) of the polypropylene multi-layered film before subjecting to the steam high-temperature sterilization treatment is less than 5%.

Figure 1:
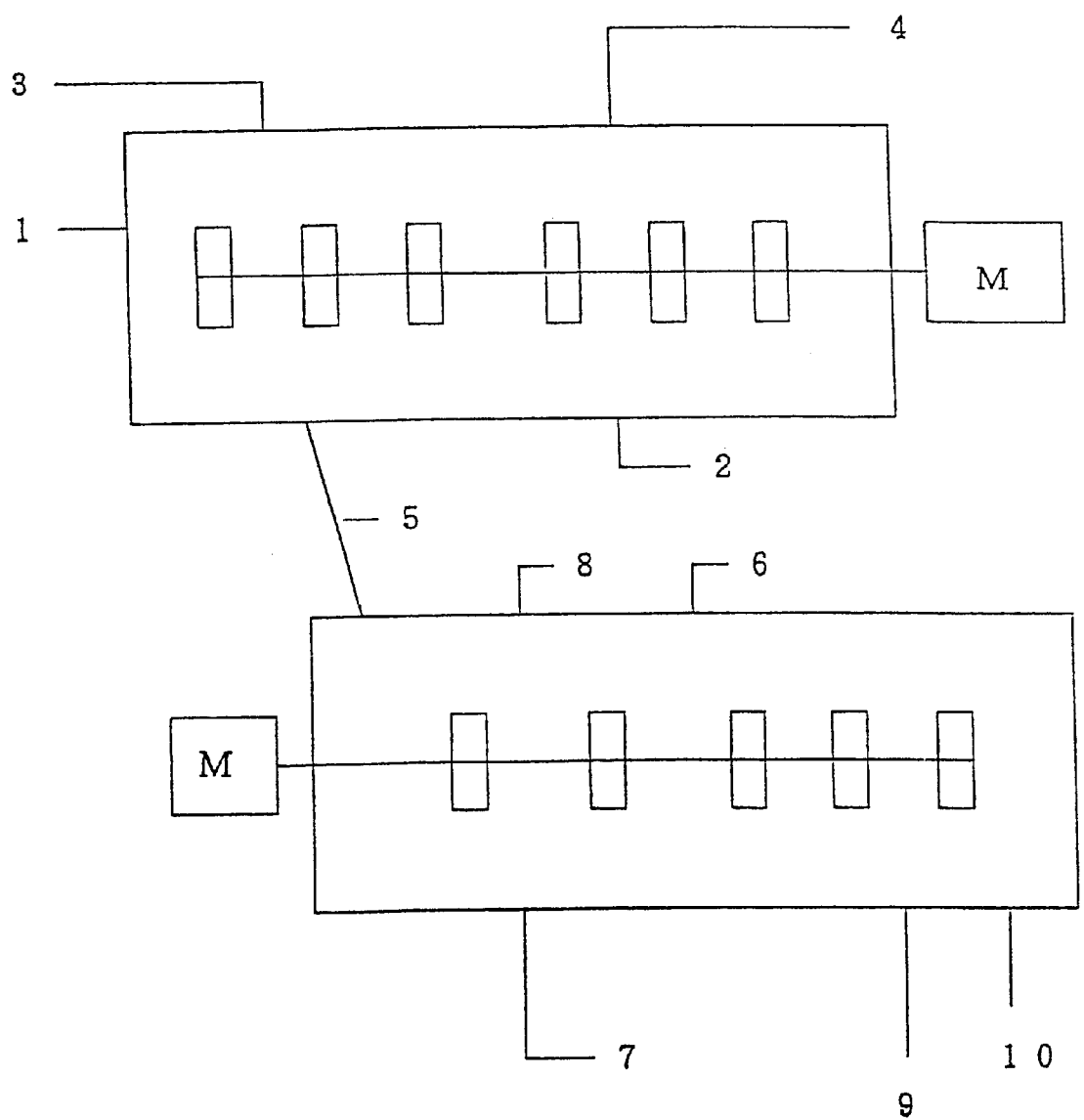
FIG. 1 shows a flow sheet of the continuous polymerizing apparatus for the manufacture of the polypropylene composition according to the present invention. Symbols in the drawing have the following meanings.

1, 10: polymerization reactor for gas phase; 2: pipe for hydrogen; 3: pipe for a propylene material; 4, 8: pipe for unreacted gas; 5, 9: pipe for taking out the polymer; 6, 7: pipe for a mixed gas material; 7: pipe for introduction of an activity suppressor; M: stirrer

BEST MODE FOR CARRYING OUT THE INVENTION

In the polypropylene composition used in the present invention, the crystalline polypropylene is a propylene-α-olefin copolymer containing 90% by weight or more but less than 98.5% by weight or more than 99.5% by weight but less than 100% by weight of propylene. The propylene content of the said crystalline polypropylene affects the transparency, the heat sealing property, the heat resistance and the mechanical characteristic such as rigidity and, the less the content, the better the transparency and the heat sealing property while the less heat resistance and the rigidity. To be mor especific, when the propylene content is 100% by weight or, in other words, in the case of a propylene homopolymer, the heat resistance and the rigidity are excellent but lowering of the transparency is significant and the crystalline polypropylene in which the propylene content is more than 99.5% by weight but less than 100% by weight is particularly suitable for the use where transparency and heat resistance are requested such as a film for a high-temperature sterilization package.

On the other hand, when the propylene content is 98.5% by weight or more, improving effect for heat sealing property and flexibility are lacking while, when the propylene content is less than 90.0% by weight, heat resistance significantly lowers and self-tackiness becomes too strong. Accordingly, the crystalline polypropylene where the propylene content is 90% by weight or more but less than 98.5% by weight is particularly suitable for a self-tacky film such as a stretch film for food package and for industrial use.

A copolymer of propylene with α-olefin is a copolymer of propylene with α-olefin which contains from 20% to 55% by weight or, more preferably, from 25% to 45% by weight of α-olefin. The content of α-olefin in the said copolymer affects the transparency, the self-tackiness, the impact resistance at low temperature, the little whitening property upon bending and the effect of preventing the lowering of transparency after heating treatment of the resulting film and, although the more the content, the more improvement in the impact resistance at low temperature, too much content affects the dispersing property of the copolymer and the crystalline polypropylene resulting in lowering of transparency, self-tackiness and little whitening property upon bending of the film.

Examples of the α-olefin which constitutes the said copolymer are ethylene, 1-butene, 1-pentene, 1-hexene, 1-octene, 1-decene, 1-dodecene, 1-tetradecene, 1-hexadecene, 1-octadecene, 1-eicosene, 4-methyl-1-pentene and 3-methyl-1-pentene. Each of those olefins may be sole or may contain one or more of other olefins.

It is also necessary for the said copolymer that a limiting viscosity thereof $[\eta]_{RC}$ measured in tetralin of 135° C. is 6.5 dl/g or less and that the limiting viscosity ratio ($[\eta]_{RC}/[\eta]_{PP}$) to the limiting viscosity $[\eta]_{PP}$ of the crystalline polypropylene measured under the same condition is within a range of from 0.6 to 1.2.

When the polypropylene composition is prepared by means of a continuous manufacture of the crystalline polypropylene and the copolymer, the limiting viscosity $[\eta]_{RC}$ of the copolymer in the said composition is unable to be measured directly and, therefore, that is calculated from the directly-measurable limiting viscosity $[\eta]_{PP}$ of the crystalline polypropylene, limiting viscosity $[\eta]_{WHOLE}$ of the whole polypropylene composition and the weight % ($W_{RC}$) of the copolymer using the following formula (1).

$$[\eta]_{RC}=\{[\eta]_{WHOLE}-(1-W_{RC}/100)[\eta]_{PP}\}/(W_{RC}/100) \quad (1)$$

Here, the term "a continuous manufacture" means that the crystalline polypropylene is manufactured by the first stage which will be mentioned later (the first polymerization step) and then, in the second stage, a copolymer of propylene with α-olefin is continuously manufactured (the second polymerization step).

Limiting viscosity of the copolymer $[\eta]_{RC}$ particularly affects the processing characteristic (film fabrication property and rigidity) of the film while the limiting viscosity ratio $[\eta]_{RC}/[\eta]_{PP}$ of the copolymer and the crystalline polypropylene affects the dispersibility of the copolymer into the crystalline polypropylene. When the limiting viscosity of the copolymer $[\eta]_{RC}$ is too much, a film fabrication property is deteriorated and that causes a problem in the production of the film. On the other hand, when the limiting viscosity ratio $[\eta]_{RC}/[\eta]_{PP}$ of the copolymer to the crystalline polypropylene is too small, impact resistance at low temperature becomes insufficient while, when it is too large, transparency, self-tackiness, little whitening property upon bending and an effect of improving the prevention of lowering of transparency after heating treatment lower where by a desired object cannot be achieved.

In the polypropylene composition of the present invention, it is necessary that the product, i.e. ($[\eta]_{RC}/[\eta]_{PP}$)× ($W_{PP}/W_{RC}$), of the ratio by weight ($W_{PP}/W_{RC}$) of the said crystalline polypropylene to the said copolymer with the said limiting viscosity ratio ($[\eta]_{RC}/[\eta]_{PP}$) is within a range of from 0.2 to 4.5.

The requirement that the product of the said weight ratio with the said limiting viscosity ratio is within the above-mentioned range is an essential condition for the result that plural domains comprising a copolymer of propylene with α-olefin are dispersed in a state of being extended in the flow direction of the above-mentioned composition during the molding process or for the fact that a specifically dispersed structure of connection of any of such dispersed domains with other domains at least at one part is available. When the said value is within the above-mentioned numeral range, transparency, self-tackiness, impact resistance at low temperature, little whitening property upon bending and an effect of preventing the lowering of the transparency after heating treatment of the resulting film are good but, when it becomes large exceeding the said range, the resulting film does not show the desired self-tackiness, little whitening property upon bending and an improving effect of preventing the lowering of transparency after heating treatment.

In view of the fabrication property of fabricating the film and also of the appearance of the resulting film, a melt flow rate (230° C.; load: 21.18N) of the said polypropylene composition is preferably from 0.1 g to 50 g/10 minutes or, more preferably, from 0.5 g to 20 g/10 minutes.

When the above-mentioned various properties are satisfied or, in other words, when plural domains comprising a copolymer of propylene with α-olefin are dispersed in a state of extending in the flow direction of the above-mentioned composition during the molding process or when a specifically dispersed structure of connection of any of such dispersed domains with other domains at least at one part is available, the polypropylene composition used in the present invention is suitable as a material for the manufacture of film having transparency, impact resistance at low temperature, heat sealing property, little whitening property upon bending and an effect of preventing the lowering of transparency after heating treatment.

In the multi-layered polypropylene film for a high-temperature sterilization packing concerning claims 8–11, the copolymer component contains not less than 80% by weight or, preferably, 85% by weight (based upon the weight of the copolymer component) of soluble components which are soluble in xylene at 20° C. Since the % by weight ($CXS_{RC}$) of the xylene-soluble components at 20° C. is unable to be measured directly, it is calculated from the weight % ($CXS_{PP}$) of xylene-soluble components at 20° C. of the homopolymer component, the weight % ($CXS_{WHOLE}$) of xylene-soluble components at 20° C. of the whole propylene block copolymer composition and weight % ($W_{RC}$) of the copolymer component using the following formula (2).

$$CXS_{RC}=\{CXS_{WHOLE}-(1-W_{RC}/100)CXS_{PP}\}/(W_{RC}/100) \quad (2)$$

The polypropylene composition of the present invention may be manufactured by any method so far as the composition satisfies the above-mentioned characteristics. It is of course possible that crystalline polypropylene and a copolymer of propylene with α-olefin to be used in the present invention which are separately prepared are mixed using a mixing apparatus whereupon the polypropylene composition is manufactured or that crystalline polypropylene is manufactured and then a copolymer of propylene with α-olefin is manufactured in the presence of the crystalline polypropylene whereupon the polypropylene composition is continuously manufactured.

To be more appropriate, manufacturing methods as shown below may be exemplified.

The constituting characteristic of the method for the manufacture of the propylene composition used in the present invention is that a crystalline polypropylene is manufactured as the first stage in a gas phase in the presence of a stereoregular catalyst comprising a solid catalyst component (A) containing titanium of a big particle size, an organoaluminum compound (B) and an organosilicon compound (C) (the first polymerization step) and, as the second stage, a copolymer of propylene with α-olefin is continuously manufactured (the second polymerization step). With regard to the titanium-containing solid catalyst component (A) in the said manufacturing method, any known one may be used so far as it is a component where a titanium compound is carried on an inorganic carrier such as magnesium compound, silica compound or alumina or on an organic carrier such as polystyrene or it is a component where such a carrier is, if necessary, made to react with an electron-donating compound such as ethers (e.g., 2-methyl-2-isobutyl-1,3-dimethoxypropane) and esters (e.g., di-n-butyl phthalate and diisobutyl phthalate).

Thus, a titanium-containing solid catalyst component prepared by spraying an alcoholic solution of a magnesium compound, partially drying the said solid component and then by treating the said partially dried solid component with an electron-donating compound such as titanium halide or di-n-butyl phthalate (Japanese Patent Laid-Open No. 119, 003/1991) and a titanium-containing solid catalyst component prepared by dissolving a magnesium compound in tetrahydrofuran/alcohol/electron donor and by treating a magnesium simple substance separated by a sole $TiCl_4$ or a combination of it with the said electron donor with titanium halide and the above-mentioned electron-donating compound (Japanese Patent Laid-Open No. 103,604/1992) may be exemplified.

As to the said titanium-containing catalyst component (A), that having an average particle size of from 25 μm to 300 μm or, preferably, from 30 μm to 150 μm is used. When the average particle size of the said titanium-containing catalyst component (A) is less than 25 μm, fluidity of the manufactured powdery polypropylene composition, i.e. powder fluidity, is significantly deteriorated and that greatly disturbs the safe operation such as that the polymerization system is polluted due to adhesion of the said polypropylene composition to the wall of the polymerization apparatus or to stirring fan and that the conveyance of the powder discharged from the polymerization apparatus becomes difficult.

In addition, degree of homogeneity in normal distribution of the said titanium-containing catalyst (A) is preferably not more than 2.0. When the degree of homogeneity is more than 2.0, powder fluidity of the resulting powdery polypropylene composition becomes bad and a stable operation on a continuous basis becomes difficult.

With regard to the organoaluminum compound (B), an organoaluminum compound (B) which is represented by the formula $R^1_m AlX_{3-m}$ (in the formula, $R^1$ is a hydrocarbon group having 1 to 20 carbon(s); X is a halogen atom; m is a positive number of $3 \geq m \geq 1.5$) may be used.

To be more specific, trimethyl aluminum, triethyl aluminum, tri-n-propyl aluminum, tri-n-butyl aluminum, tri-isobutyl aluminum, dimethylaluminum chloride, diethylaluminum chloride, methylaluminum sesquichloride, di-n-propylaluminum monochloride, ethylaluminum sesquichloride, ethylaluminum dichloride, diethylaluminum iodide, ethoxydiethyl aluminum, etc. may be exemplified and, preferably, triethyl aluminum is used.

Each of those organoaluminum compounds may be used solely or two or more of them may be used as a mixture.

With regard to the organosilicon compound (C), an organosilicon compound which is represented by the formula $R^2_X R^3_Y Si(OR^4)_2$ (in the formula, $R^2$ and $R^4$ each is a hydrocarbon group; $R^3$ is a hydrocarbon group or a hydrocarbon group containing a hetero atom; $0 \leq X \leq 2$; $1 \leq Y \leq 3$; $1 \leq Z \leq 3$; and X+Y+Z=4).

To be more specific, methyl trimethoxysilane, ethyl trimethoxysilane, n-propyl trimethoxysilane, phenyl methyl dimethoxysilane, tert-butyl trimethoxysilane, tert-butyl triethoxysilane, phenyl triethoxysilane, methyl ethyl dimethoxysilane, methyl phenyl diethoxysilane, dimethyl dimethoxysilane, dimethyl diethoxysilane, diisopropyl dimethoxysilane, diisobutyl dimethoxysilane, di-tert-butyl dimethoxysilane, diphenyl dimethoxysilane, trimethyl methoxysilane, cyclohexyl methyl dimethoxysilane and trimethyl ethoxysilane may be exemplified. Preferably, diisobutyl dimethoxysilane, diisopropyl dimethoxysilane, di-tert-butyl dimethoxysilane, cyclohexyl methyl dimethoxysilane and diphenyl dimethoxysilane are used.

Each of those organosilicon compounds may be used either solely or two or more of them may be used as a mixture.

The stereoregular catalyst in which the above-mentioned titanium-containing solid catalyst composition (A), organoaluminum compound (B) and, if necessary, organosilicon compound (C) are combined is used for a propylene polymerization of the first polymerization step and it is preferred that the said titanium-containing solid catalyst (A) is used as a catalyst which is subjected to a preliminary activation treatment by reacting with α-olefin previously. In the preliminary activation treatment of the titanium-containing solid catalyst composition (A), there is no particular limitation for the amount of the organoaluminum compound (B') used. Usually, however, it is used within a range of from 0.1 mol to 40 mol or, preferably, from 0.3 mol to 20 mol to 1 mol of the titanium atom in the titanium-containing catalyst composition and 0.1 g to 100 g or, preferably, 0.5 g to 50 g of α-olefin is made to react with 1 g of the titanium-containing solid catalyst composition (A) at from 10° C. to 80° C. for 10 minutes to 48 hours.

In the preliminary activation treatment, it is also possible that an organosilicon compound (C') is previously used within a range of from 0.01 mol to 10 mol or, preferably, from 0.05 mol to 5 mol to 1 mol of the organoaluminum compound.

With regard to the organoaluminum compound (B') used for the above-mentioned preliminary activation treatment, the above-exemplified organoaluminum compound (B) used for the main polymerization may be used. As to this organoaluminum compound (B') used therefor, it may be either same as or different from the organoaluminum compound (B) used for the main polymerization although it is preferred to use triethyl aluminum.

With regard to the organosilicon compound (C') which is used in the preliminary activation treatment if necessary, the same ones which are already exemplified for the organosilicon compound (C) may be exemplified as well. As to this organosilicon compound (C') used therefor, it may be either same as or different from the organosilicon compound (C) used for the main polymerization although it is preferred to use diisobutyl dimethoxysilane, diisopropyl dimethoxysilane, di-tert-butyl dimethoxysilane, cyclohexyl methyl dimethoxysilane and diphenyl dimethoxysilane.

Examples of the α-olefin used for a preliminary activation treatment for the titanium-containing solid catalyst component (A) are ethylene, propylene, 1-butene, 1-pentene, 1-hexene, 1-octene, 1-decene, 1-dodecene, 1-tetradecene, 1-hexadecene, 1-octadecene, 1-eicosene 4-methyl-1-pentene and 3-methyl-1-pentene. Each of the olefins may be used solely or may contain another olefin or more olefins as a mixture. In its polymerization, a molecular weight adjusting agent such as hydrogen may be used together for adjusting the molecular weight of the polymer.

The inert solvent which is used for the preliminary activating treatment for the titanium-containing solid catalyst component (A) is an inert solvent which does not significantly affect the polymerization reaction such as a liquid saturated hydrocarbon (e.g., hexane, heptane, octane, decane, dodecane and liquid paraffin) and a silicone oil having a structure of dimethyl polysiloxane. Such an inert solvent may be either one single solvent or a mixed solvent comprising two or more.

In using such an inert solvent, it is preferred to use the solvent after removal of impurities such as water and sulfur compounds which badly affect the polymerization.

The first polymerization step where the crystalline polypropylene is manufactured by polymerization of propylene or of the said propylene with a small amount of α-olefin in a gas phase in the presence of the above preliminarily activated titanium-containing solid catalyst component (A) and the second polymerization step where the copolymer of propylene with α-olefin is manufactured by a copolymerization of propylene and α-olefin in the presence of the said crystalline polypropylene are continuously carried out.

The said first polymerization step is not limited to a gas phase polymerization method but a slurry polymerization method or a bulk polymerization method may be adopted as well. However, since the second polymerization step thereafter is preferably a gas phase polymerization method, it is preferred that the first polymerization also adopts a gas phase polymerization method. When a slurry polymerization method or a bulk polymerization method is adopted as the second polymerization step, the resulting copolymer is dissolved into a solution and continuance of a stable operation is difficult.

Condition for the polymerization of the crystalline polypropylene varies depending upon the mode of polymerization and, in the case of a gas phase polymerization, propylene or the said propylene with a small amount of α-olefin is provided to a predetermined amount of the powdery polypropylene composition which is mixed and stirred in the presence of a stereoregular catalyst comprising the preliminarily activated titanium-containing solid catalyst component (A), the organoaluminum component (B) and the organosilicon compound (C) under the condition of the polymerization temperature of 20° C. to 120° C. or, preferably, from 40° C. to 100° C. and the polymerization pressure of from atmospheric pressure to 9.9 MPa or, preferably, 0.59 Mpa to 5.0 MPa whereupon the polymerization is carried out to manufacture the crystalline polypropylene.

The ratio of the organoaluminum compound (B) to the titanium-containing solid catalyst (A) is Al/Ti=1 to 500 (molar ratio) or, preferably, 10 to 300. In that case, the molar numbers of the titanium-containing solid catalyst component (A) is substantially gram atom numbers of Ti in the titanium-containing solid catalyst composition (A).

The ratio of the organosilicon compound (C) to the organoaluminum component (B) used is B/C=1 to 10 (molar ratio) or, preferably, 1.5 to 8. When the molar ratio B/C is too much, crystallinity of the crystalline polypropylene lowers and the rigidity of the resulting polypropylene composition becomes insufficient. When the said molar ratio B/C is too small, the polymerization activity significantly lowers and the productivity lowers.

In adjusting the molecular weight of the crystalline polypropylene, it is possible to use a molecular weight adjusting agent such as hydrogen during the polymerization and that is carried out whereby the limiting viscosity of the crystalline polypropylene satisfies the requirement of the present invention. After polymerization of the crystalline polypropylene, a part of the resulting powdery polymer is taken out and is subjected to measurements of limiting viscosity, melt flow rate and polymerization yield per unit weight of the catalyst.

After the polymerization of the first polymerization step, there is carried out the second polymerization step in which a mixed monomer of propylene and α-olefin is copolymerized under the condition of the polymerization temperature of from 20° C. to 120° C. or, preferably, from 40° C. to 100° C. and the polymerization pressure of from atmospheric pressure to 9.9 MPa or, preferably, from 0.59 Mpa to 5.0 MPa to give a copolymer of propylene with α-olefin. The amount of the α-olefin in the copolymer is adjusted to 25% to 55% by weight by controlling the gas molar ratio of the α-olefin monomer to the propylene monomer in the comonomer gas.

On the other hand, weight of the copolymer to weight of the crystalline polypropylene is adjusted by adjusting the polymerization time or by using a polymerization activity adjusting agent for the catalyst such as carbon monoxide or hydrogen sulfide whereupon the weight of the copolymer is made 10% to 50% by weight. In addition, molecular weight of the copolymer is adjusted by adding a molecular weight adjusting agent such as hydrogen during the polymerization of the copolymer so that the limiting viscosity of the copolymer meets with the requirement of the polypropylene composition used in the present invention. In the meanwhile, a method for supplying the hydrogen is carried out so that the resulting polypropylene meets with the requirement of the present invention.

As to a method for the polymerization, any of a batch method, a semi-continuous method and a continuous method may be adopted and, from an industrial view, a continuous polymerization method is preferred.

After completion of the second polymerization step, the monomer is removed from the polymerization system whereby the powdery polypropylene composition can be obtained. A part of the resulting polypropylene composition is subjected to measurements of limiting viscosity, amount of α-olefin and polymerization yield per unit weight of the catalyst.

The polypropylene composition used in the present invention may be compounded with antioxidant, neutralizing agent, weather resisting agent, inorganic filler, lubricant, anti-blocking agent, anti-static agent, anti-clouding agent, etc. which are commonly used for polyolefin within such an extent that the object of the present invention is not deteriorated.

As to the said antioxidant, that of a phenol type and that of a phosphorus type may be exemplified; as to the said neutralizing agent, higher fatty acid salts such as calcium stearate may be exemplified; as to the said inorganic filler and anti-blocking agent, calcium carbonate, silica, hydrotalcite, zeolite, aluminum silicate, magnesium silicate, etc. may be exemplified; as to the said lubricant, higher fatty acid amides such as stearic acid amide may be exemplified; and, as to the said anti-static agent and anti-clouding agent, nonionic surface-active agents such as glycerol monostearate, sorbitan fatty acid esters, polyglycerol fatty acid esters, polyoxyethylene sorbitan fatty acid esters and polyoxyethylene glycerol fatty acid esters may be exemplified.

As to a method for compounding the polypropylene composition with the above-mentioned stabilizer, etc., a method for compounding using the common compounding apparatus such as a mixer equipped with a high-speed stirrer (e.g., Henshel mixer (trade name)), a ribbon blender and a tumbler mixer as well as a method for preparation of pellets using a common single screw extruder or a twin screw extruder may be exemplified.

The polypropylene film and the self-tacky film of the present invention are non-oriented or oriented (uniaxial orientation, biaxial orientation) films using the polypropylene composition. As to a method for the manufacture of the said film, a T die method and an inflation method which is usually used for the manufacture of polyolefin film may be exemplified and, as to a method for the orientation, a successive biaxial orientation method by a tenter system and a simultaneous biaxial orientation method by a tubular system may be exemplified.

The multi-layered polypropylene film and the self-tacky multi-layered film of the present invention are non-oriented and oriented (uniaxial orientation, biaxial orientation) films using the said polypropylene composition at least as one layer and examples of the layer constitution of the said multi-layered film are a multi-layered film of "two kinds in two layers" using "(a layer using a thermoplastic resin) (the said polypropylene composition)" and a multi-layered film of "two kinds in three layers" or "3 kinds in 3 layers" using "(a layer using the said polypropylene composition)/(a layer using the thermoplastic resin (1))/(a layer using the thermoplastic resin (2)", "(a layer using the said polypropylene composition)/(a layer using the thermoplastic resin)/(a layer using the said polypropylene composition)" or "(a layer using the thermoplastic resin (1))/(a layer using the said polypropylene composition)/(a layer using the thermoplastic resin (1) or (2))". Here, the distinction by way of the thermoplastic resins (1) and (2) means that different thermoplastic resins are used.

Examples of the thermoplastic resin mentioned hereinabove are α-polyolefins such as high-density polyethylene, low-density polyethylene, linear low-density polyethylene, polypropylene, propylene-α-olefin copolymer and poly-4-methylpentene-1; olefin elastomers such as ethylene-propylene elastomer and ethylene-butene elastomer; Nylon; polyethylene terephthalate; polyvinyl acetate; polyvinyl alcohol; and styrene elastomers such as styrene-butadiene elastomer.

With an object of reinforcing the adhesive property of the said propylene composition layer to the thermoplastic resin layer to such an extent that the object of the present invention is not deteriorated, it is also possible that a modified polyolefin resin layer such as chlorinated polypropylene is provided between both layers and that the said polypropylene composition is used after blending with the thermoplastic resin.

Although the total thickness of the said multi-layered film is not particularly limited, it is preferably from 8 μm to 100 μm or, more preferably, from 10 μm to 70 μm in view of the processability of the film. Further, although the thickness of each layer of the said multi-layered film is not particularly limited as well, the ratio of the layer using the polypropylene composition to the total thickness of the multi-layered film is preferably from 10% to 90% or, more preferably, from 20% to 80% in view of transparency, impact resistance at low temperature, little whitening property upon bending and an effect of preventing the lowering of transparency after heating treatment.

Examples of the method for the manufacture of the said multi-layered film are a multi-layer extrusion molding method, a dry lamination method and an extrusion lamination method. Examples of the said multi-layer extrusion molding method are an inflation method and a T die method commonly used for the manufacture of polyolefin. Examples of the method for the orientation are a successive biaxial orientation method by a tenter system and a simultaneous biaxial orientation method by a tubular system.

In the manufacture of the said multi-layered film by the above-mentioned known methods, although there is no particularly limitation for the melt flow rate (MFR) of the polypropylene composition and the thermoplastic resin constituting each of the layers, the ratio ($MFR_A/MFR_B$) of the MFR of the polypropylene composition ($MRF_A$) to the MFR of the thermoplastic resin ($MFR_B$) is preferably 0.1 to 10 or, more preferably, 0.5 to 2 in view of the molding property of the film and the appearance of the film.

In addition, the preferred embodiment of the MFR of the film (MFR/film) of the multi-layered polypropylene film of the present invention is within a range of from 0.5 g to 5.0 g/10 minutes or, preferably, within a range of from 1.0 g to 5.0 g/10 minutes in view of the fabricating property of the film, the appearance of the said multi-layered polypropylene film produced and the sealing strength (degree of tight sealing) when the content is tightly sealed.

A preferred embodiment of the multi-layered polypropylene film of the present invention is that the difference of the haze value (HAZE/after) of the film after being subjected to a high-temperature steam sterilization of from 120° C. or higher but lower than 140° C. and the haze value (HAZE/before) of the film before being subjecting to that is less than 5% or, preferably, less than 3%. When the haze difference is 5% or more, transparency of the film is significantly poor and a problem such as the content is hardly seen is resulted.

With an object of giving printing property, laminate adaptability and metal vapor deposition characteristic and promoting the transfer of the anti-static agent or the like onto the surface of the film, it goes without saying that the film or the multi-layered film prepared by the present invention can be subjected to a surface treatment such as a corona discharge treatment, a flame treatment and a plasma treatment by the methods which are usually adopted in an industrial scale.

EXAMPLES

Now the present invention will be specifically illustrated by way of the following Examples and Comparative Examples although the present invention is not limited by them at all. Incidentally, methods for the measurement of physical properties of the polypropylene composition, etc. used in the present invention are as follows.

(a) Limiting viscosity (unit: dl/g). This was measured using tetralin (tetrachloronaphthalene) as a solvent under the temperature condition of 135° C. using an automatic viscometer (type AVS2; manufactured by Mitsui Toatsu Chemicals).

(b) Particle size (unit: μm) and degree of homogeneity of the titanium-containing solid catalyst component (I). An average particle size calculated from the particle size distribution measured by a MasterSizer (manufactured by Malvern) was defined as the particle size while the value obtained by dividing the particle size under 60% sieving by the particle size under 10% sieving was defined as the degree of homogeneity.

(c) Content of ethylene (unit: % by weight). This was measured by an infrared absorption spectrometry.

A method for the manufacture of the polypropylene composition used in Examples and Comparative Examples are shown as follows.

1) Preparation of the Titanium-containing Solid Catalyst Composition a) Titanium-containing Solid Catalyst Component (I):

Anhydrous $MgCl_2$ (95.3 g) and 352 ml of dry EtOH were charged in an autoclave made of stainless steel which was substituted with nitrogen and the mixture was heated at 105° C. with stirring to dissolve. After stirring for 1 hour, the solution was sent into a two-fluid spray nozzle using a compressed nitrogen (1.1 MPa) heated at 105° C. The flow amount of the nitrogen gas was 38 liters (at the standard state of the gas at 0° C. and 1 atmospheric pressure) per minute. Liquid nitrogen was introduced into the spray tower for cooling and the temperature in the tower was kept at −15° C. The product was collected in a cooled hexane which was introduced into the bottom of the tower whereupon 256 g were obtained. From the analytical result of the product, the composition of this carrier was $MgCl_2.6EtOH$ as same as in the starting solution.

The above-prepared carrier was classified by means of sieving to give 205 g of the spherical carrier having the particle size of from 45 μm to 212 μm. The resulting carrier was subjected to a through-flow drying at room temperature for 181 hours using nitrogen of a flow rate of 3 liters (at the standard state of the gas at 0° C. and 1 atmospheric pressure) per minute to give a dry carrier having a composition of $MgCl_2.1.7EtOH$.

In a glass flask, 20 g of the dry carrier, 160 ml of titanium tetrachloride and 240 ml of pure 1,2-dichloroethane were mixed and heated at 100° C. with stirring, 6.8 ml of diisobutyl phthalate were added thereto, the mixture was heated at 100° C. for 2 hours, a liquid phase part was removed by means of decantation and 160 ml of titanium tetrachloride and 320 ml of pure 1,2-dichloroethane were added to the carrier in the solid phase again. After heating and keeping at 100° C. for 1 hour, the liquid phase part was removed by means of decantation and the solid phase part was washed with pure hexane and then dried to give the titanium-containing solid catalyst component (I). An average particle size of the resulting titanium-containing solid catalyst component (I) was 115 μm and its analytical data were 19.5% by weight of Mg, 1.6% by weight of Ti, 59.0% by weight of Cl and 4.5% by weight of diisobutyl phthalate.

2) Preliminary Activating Treatment of Titanium-containing Solid Catalyst Component (I)

After a reactor made of stainless steel having an inner volume of 15 liters and equipped with a inclined fan was substituted with nitrogen gas, 8.3 liters of a saturated hydrocarbon solvent (Crystol-52 manufactured by Esso Petroleum) having a dynamic viscosity of 7.3 centistokes at 40° C., 525 mmol of triethyl aluminum, 80 mmol of diisopropyl dimethoxysilane and 700 g of the titanium-containing solid catalyst component (I) prepared in the above item were added at room temperature, warmed up to 40° C. and made to react for 7 hours with 0.15 MPa particle pressure of propylene to carry out a preliminary activation treatment. The result of the analysis was that 3.0 g of propylene reacted per 1 g of the titanium-containing solid catalyst component.

3) First Polymerization Step

The above-mentioned preliminarily activated titanium-containing solid catalyst component (0.5 g/hr), triethyl aluminum as an organoaluminum compound (II) and diisopropyl dimethoxysilane as an organosilicon compound (III) were continuously supplied to a polymerization reactor (1) (L/D=6; inner volume: 100 liters) having a stirring fan as shown in the attached FIG. 1. Propylene was continuously supplied thereto so as to keep the condition of reaction temperature of 70° C., reaction pressure of 2.5 MPa and stirring rate of 40 rpm and, in order to adjust the molecular weight of the resulting crystalline polypropylene, hydrogen gas was continuously supplied from the circulation pipe (2) whereby the limiting viscosity of the resulting polymer was controlled by the hydrogen concentration of the gas phase in the reactor.

Heat of reaction was removed by means of heat of vaporization of the propylene monomer material supplied from the pipe (3). Unreacted gas discharged from the polymerization reactor (1) was cooled and condensed outside the reactor system via the pipe (4) and returned to the polymerization reactor (1).

The crystalline polypropylene obtained in this polymerization reactor (1) was continuously taken out from the polymerization reactor (1) from the pipe (5) so that the level of the polymer held became 50% by volume of the volume of the reaction volume and supplied to the polymerization reactor (10) of the second polymerization step. At that time, a part of the crystalline polypropylene obtained from the pipe (5) was taken out intermittently and used as a sample for determining the limiting viscosity and the polymer yield per unit weight of the catalyst by a high-frequency inductively coupled plasma emission spectrometry (ICP method).

4) Second Polymerization Step

The crystalline polypropylene from the first polymerization step and a mixed monomer gas of ethylene and propylene were continuously supplied to a polymerization reactor (10) of a transverse type (L/D=6, inner volume: 100 liters) to carry out the copolymerization of ethylene with propylene. The reaction condition was that the stirring rate of 40 rpm, the temperature of 60° C. and the pressure of 2.1 MPa and the ethylene unit content in the copolymer components was adjusted by the molar ratio of ethylene/propylene in the gas phase. In order to adjust the polymerized amount of the copolymer and in order to adjust the molecular weight of the copolymer components, carbon monoxide as a polymerization activity suppressor and hydrogen gas, respectively were supplied from the pipe (7).

Heat of reaction was removed by means of heat of evaporation of the liquid propylene material supplied from the pipe (6).

Unreacted gas discharged from the polymerization reactor (10) was cooled and condensed outside the reactor system by passing through the pipe (8) and returned to the present copolymerization step. The resulting polypropylene composition was taken out from the polymerization reactor (10) by a pipe (9) so as to make the level of keeping the polymer 50% by volume of the reaction volume.

The production rate of the resulting polypropylene composition was from 8 kg to 12 kg/hr.

With regard to the polypropylene composition which was taken out, the unreacted monomers were removed and a part of the composition was subjected to measurements of limiting viscosity and ethylene in the copolymer by means of an infrared spectroscopy and also measurement of Mg by means of a high-frequency inductively coupled plasma emission spectrometry (ICP method) for determining the polymerization ratio of the copolymer.

Now, the methods for the evaluation of the film obtained in Examples and Comparative Examples will be mentioned as follows.

(1) Transparency (unit: %). Haze of the film was measured according to ASTM D 1003 and used as a standard for the transparency. The smaller the value, the better the transparency.

(2) Impact resistance at low temperature (unit: ° C.). The film was kept for 15 minutes in a thermostat vessel set at a predetermined temperature, then an impact strength of the film was measured according to ASTM D 781 and the temperature where the strength was not more than 0.5[J] and brittleness destruction was also noted was used as an index for the impact resistance. The lower the said temperature, the better the impact resistance at low temperature.

(3) Heat sealing temperature (unit: ° C.). A dry lamination was carried out using a biaxially oriented polypropylene film (20μ) and an adhesive, the said laminated film was heat-sealed at a heat sealing temperature within a range of 130–190° C. with an interval of 5° C. (eight temperature conditions in total) at the sealing pressure of 2 MPa and the sealing time of 0.5 second to carry out a heat sealing of 10 mm width, then a 900 peeling test of the sealed part at each sealing temperature was carried out using a sample cut in a stripe of 15 mm width at a tensile rate of 300 mm/minute and the lowest temperature showing an adhesion strength of 5 N/15 mm or more is defined as a heat sealing temperature. The lower the said temperature, the better the heat sealing property.

(4) Self-tackiness. A sample cut into a 30 cm square was made round by a tester using hand and the changes in the shape after 10 minutes was observed. The case where no change was noted from the shape immediately after rounding was defined "oo", the case where some spreading (returning) was noted was defined "o" and the case where apparent change in the shape was noted or the case where the shape was unable to be retained immediately after rounding was defined "x".

(5) Heat resistance (unit: ° C.). A sample in a stripe of 10×100 mm cut from the multi-layered film was held for 10 minutes in a silicone oil vessel set at predetermined temperature, the length in the longitudinal direction was measured and the temperature where the shrunk length from the initial length expressed in terms of percent was more than 2% was used as an index for the heat resistance. The higher the temperature, the better the heat resistance. The evaluation was as follows.

G (good): 145° C. or higher

N (no good): lower than 145° C.

(6) Sealing strength (unit: N/15 cm). A hot bar of 1 cm×10 cm was heated at 200° C. and the multi-layered films were thermally adhered with a pressure of 2 MPa for 2 seconds. The fused multi-layered films were cut in a stripe of 15 mm (width)×5 cm (length) and the adhesion strength of the fused part was measured by a tensile rate of 300 mm/minute and used as one of the indexes for a tight sealing property. The evaluation was as follows.

G (good): 1.5 N/15 mm or more

N (no good): less than 1.5 N/15 mm (7) High-temperature Sterilization Treating Method The resulting multi-layered film was subjected to a compressed steam treatment at 135° C. and 0.25 Pa pressure for 10 minutes using a 50-liter high-temperature sterilization apparatus.

(8) Little Whitening Property Upon Bending

The film was bent to an extent of 180° for five times by hand of the tester, the whitened state was observed by naked eye and the case where no whitening was noted was defined as "oo", the case where some whitening was noted was defined "o" and the case where whitening was noted was defined "x".

(9) Effect of Preventing the Lowering of the Transparency After Heating

Haze before and after the heating was measured according to ASTM D 1003 and their difference [(haze before heating)—(haze after heating)] was defined "Δhaze" (unit: %) and used as an index for the effect of preventing the lowering of transparency after heating. The less the value, the better the preventing effect for lowering the transparency after heating.

Examples 1–9 and Comparative Examples 1–7

Each polypropylene composition (99.75% by weight) manufactured by the above-mentioned manufacturing method and having the characteristics shown in Tables 1 and 2 mentioned later, 0.05% by weight of tetrakis[methylene (3,5-di-tert-butyl-4-hydroxyphenyl)propionate]methane, 0.1% by weight of tris(2,4-di-tert-butylphenyl)phosphite and 0.1% by weight of calcium stearate were charged in a Henshel mixer (trade name), stirred and mixed for 3 minutes and subjected to a melting kneading using a single screw extruder (diameter: 40 mm) to prepare each pellet. The pellet obtained in Example 1 was named BC-1 and those obtained in Examples 2–9 were named BC-2 to BC-9, respectively while the pellet obtained in Comparative Example 1 was named BC-10 and those obtained in Comparative Examples 2–7 were named BC-11 to BC-16, respectively.

Then each of the above-prepared pellets BC-1 to BC-16 was extruded at an extruding temperature of 250° C. using a single-layered extruder (diameter: 65 mmø) equipped with a T die and quickly cooled by an air chamber and a cooling roll having a surface temperature of 30° C. to each film having a thickness of 60 μm. Transparency, impact resistance at low temperature, heat sealing temperature, an effect of preventing the lowering of transparency after heating treatment and little whitening property upon bending of each of the films obtained in Examples and Comparative Examples were evaluated and the result is shown in Tables 1 and 2 which will be mentioned later.

As will be apparent from the result of Tables 1 and 2, transparency, impact resistance at low temperature and heat sealing property were excellent and little whitening property upon bending and the effect of preventing the lowering of transparency after heating treatment were good in each of the films of Examples 1 through 9 using a polypropylene composition comprising the crystalline polypropylene and the copolymer of propylene with ethylene where the limiting viscosity $[\eta]_{RC}$ of the copolymer was 6.5 dl/g or lower, the ratio of the limiting viscosity $[\eta]_{RC}$ of the copolymer to the limiting viscosity $[\eta]_{PP}$ of the crystalline polypropylene was 0.6 to 1.2 and the product of limiting viscosity with ratio by weigh of the copolymer and the crystalline polypropylene, $([\eta]_{RC}/[\eta]_{PP}) \times (W_{PP}/W_{RC})$, was within a range of 0.2 to 4.5.

On the contrary, it was noted that, in Comparative Example 1 where the limiting viscosity $[\eta]_{RC}$ of the copolymer was larger than the range of the present invention, formation of the film was not possible and, in Comparative Examples 2 where the product of limiting viscosity with ratio by weight of the copolymer and the crystalline polypropylene, $([\eta]_{RC}/[\eta]_{PP}) \times (W_{PP}/W_{RC})$, was larger than the range of the present invention, little whitening property upon bending was poor and the effect of preventing the lowering of the transparency after heating treatment was insufficient.

In the films of Comparative Examples 3 and 4 where the ratio of the limiting viscosity $[\eta]_{RC}$ of the copolymer to the limiting viscosity $[\eta]_{PP}$ of the crystalline polypropylene was out of the range of the present invention, it was noted that the impact resistance at low temperature was poor or the little whitening property upon bending was poor.

In Comparative Example 5 where the propylene content in the crystalline polypropylene was larger than the range of the invention, the heat sealing property was found to be poor.

In the film of Comparative Examples 6 and 7 where the copolymer had an ethylene content which was outside the range of the present invention, it was found that the impact resistance at low temperature was poor and the transparency was inhibited.

Examples 10–13 and Comparative Examples 8–11

Three-kind and three-layer extruders equipped with a multi-layered T die (single screw extruder having a diameter of 65 mmø for the core layer and twin screw extruders having a diameter of 50 mmø for skin layers) were used and, in Examples 10–13, BC-1 and BC-2 which were the same as those used in Examples 1 and 2 and an ethylene-propylene random copolymer (F8577A manufactured by Chisso; MFR=6; hereinafter, referred to as RPP) were supplied to the extruder(s) for core layer and/or skin layers while, in Comparative Examples 8–11, BC-11 and BC-16 which were the same as those used in Comparative Examples 2 and 7 and RPP were supplied to the extruder(s) for core layer and/or skin layers, each of them was fused at the temperature of 250° C., subjected to a two-kind and three-layer co-extrusion and cooled and solidified by an air chamber and a cooling roll having a surface temperature of 30° C. to give each of the two-kind and three-layer films of a thickness of 60 μm (layer constituting ratio=1:1:1) as mentioned in Table 3. Transparency, impact resistance at low temperature, heat sealing temperature, an effect of preventing the lowering of the transparency after heating treatment and little whitening property upon bending of each of the resulting multi-layered films were evaluated and the result is shown in Table 3 which will be mentioned later.

As will be apparent from the description of Table 3, it was found that, when the layer using the polypropylene composition having the characteristics within a range of the present invention was used at least in one layer, a multi-layered film having excellent transparency, impact resistance at low temperature and heat sealing property and good improvement in little whitening property upon bending and effect of preventing the lowering of the transparency after heating treatment was obtained.

Examples 14–22 and Comparative Examples 12–18

The polypropylene composition (99.75% by weight) as shown in Tables 4 and 5 which will be mentioned later, 0.05% by weight of tetrakis[methylene(3,5-di-tert-butyl-4-hydroxyphenyl)propionate]methane, 0.1% by weight of tris (2,4-di-tert-butylphenyl)phosphite and 0.11% by weight of calcium stearate were compounded, mixed in a Henshel mixer (trade name), fused and kneaded using a single screw extruder (diameter: 40 mmø) and made into pellets. The pellet obtained in Example 14 was named BC-17, the pellet obtained in Example 15 was named BC-18 and then the pellets obtained in Examples 16–22 were named BC-19 to 25, respectively while the pellet obtained in Comparative Example 12 was named BC-26 and the pellets obtained in Comparative Examples 13–18 were named BC-27 to 32, respectively.

Then each of the pellets BC-17 to BC-32 was extruded at the extruding temperature of 250° C. using a single-layered extruder (diameter: 65 mmø) equipped with a T die and quickly cooled by an air chamber and a cooling roll having a surface temperature of 30° C. to each film having a thickness of 15 μm. Each of the resulting films was evaluated by the above-mentioned evaluating methods and the result is shown in Tables 4 and 5 which will be mentioned later.

It was noted from the result of Table 4 and 5 that transparency, impact resistance at low temperature and heat sealing property were excellent and self-tackiness was good in the films (Examples 14–22) using a polypropylene composition comprising the crystalline polypropylene and the copolymer of propylene with ethylene where the limiting viscosity $[\eta]_{RC}$ of the said copolymer was 6.5 dl/g or lower, the ratio of the limiting viscosity $[\eta]_{RC}$ of the said copolymer to the limiting viscosity $[\eta]_{PP}$ of the crystalline polypropylene was 0.6–1.2 and the product of limiting viscosity with ratio by weigh of the said copolymer and the crystalline polypropylene, $([\eta]_{RC}/[\eta]_{PP}) \times (W_{PP}/W_{RC})$, was within a range of 0.2–4.5.

On the contrary, it was noted that, in Comparative Example 12 where the limiting viscosity $[\eta]_{RC}$ of the copolymer was larger than the range of the present invention, fabrication of the film was not possible and, in Comparative Examples 13 where the product of limiting viscosity with ratio by weight of the copolymer and the crystalline polypropylene, $([\eta]_{RC}/[\eta]_{PP}) \times (W_{PP}/W_{RC})$ was larger than the range of the present invention, no self-tackiness was available.

Further, in the cases where the ratio of the limiting viscosity $[\eta]_{RC}$ of the copolymer to the limiting viscosity $[\eta]_{PP}$ of the crystalline polypropylene was out of the range of the present invention (Comparative Examples 14 and 15), it was noted that the impact resistance at low temperature was poor or the self-tackiness was not available.

In Comparative Example 16 where the propylene content in the crystalline polypropylene was larger than the range of the invention, the heat sealing property was found to be poor and, in Comparative Examples 17 and 18 where the copolymer had an ethylene content which was outside the range of the present invention, it was found that the impact resistance at low temperature was poor and the transparency was inhibited.

Examples 23–26 and Comparative Examples 19–22

Three-kind and three-layer extruders (single screw extruder having a diameter of 65 mmø for a core layer and two single screw extruder having a diameter for 50 mmø for skin areas) equipped with a multi-layered T die was used and BC-18 and BC-27 which were as same as those using in Example 15 and Comparative Example 13 shown in Tables 4 and 5 were supplied to one or two single screw extruder(s) while a linear low-density polyethylene (TUF-2060 manufactured by Nippon Unicar; MI=1; may be referred to as LLDPE) or an ethylene-propylene random copolymer (F8577A manufactured by Chisso; MFR=6; referred to as RPP as hereinafter) was supplied to an extruder for a core layer and/or another single screw extruder for skin layer, then fused at 250° C., subjected to a two-kind and three-layer multi-layered extrusion and cooled and solidified by an air chamber and a cooling roll having a surface temperature of 30° C. to give a two-kind and three-layer multi-layered film having a thickness of 15 μm (ratio of constitution of the thickness=1:1:1). The resulting multi-layered film was evaluated and the result is shown in Table 6 which will be mentioned later.

It is apparent from Table 6 that, when a film layer using the polypropylene composition within a range of the present invention is used at least as one layer of the surface layers of the multi-layered film, the resulting multi-layered film has excellent transparency, impact resistance at low temperature and heating sealing property and a good self-tackiness.

Examples 27–34

As the materials to be used for the core layer, 99.79% by weight of a propylene block copolymer composition as shown in Table 7 (BC-33 to BC-40), 0.03% by weight of tetrakis[methylene(3,5-di-tert-butyl-4-hydroxyphenyl) propionate]methane, 0.08% by weight of tris(2,4-di-tert-butylphenyl)phosphite and 0.1% by weight of calcium stearate were mixed in a Henshel mixer (trade name) and fused and kneaded at 200° C. using a single screw extruder (diameter: 40 mmø) to make into pellets. In the meanwhile, as the materials to be used for the skin layer, 99.79% by weight of apropylene polymer (PP-1; a propylene homopolymer having a density of 0.90 g/cm³, melting point of the crystals of 163° C. and MFR of 7.0 g/10 minutes), 0.03% of tetrakis[methylene(3,5-di-tert-butyl-4-hydroxyphenyl)propionate]methane, 0.08% by weight of tris(2,4-di-tert-butylphenyl)phosphite and 0.1% by weight of calcium stearate were mixed in a Henshel mixer (trade name) and fused and kneaded at 200° C. using a single screw extruder (diameter: 40 mmø) to make into pellets.

Three-kind and three-layer extruder equipped with a multi-layered T die (one single screw extruder having a diameter of 65 mmø and two single screw extruders having a diameter of 50 mmø) were used and each of the pellet (AA) comprising the above-mentioned propylene block copolymer composition and additives and the pellet (BB) comprising the propylene polymer and the additives were supplied to each extruder, fused at 230° C., co-extruded and cooled and solidified with an air chamber and a cooling roll having a surface temperature of 30° C. to give a two-kind and three-layer non-oriented film having a thickness of 70 μm and comprising (skin layer)/(core layer)/(skin layer)=(BB)/(AA)/(BB) (thickness constituting ratio=1/4/1).

The resulting two-kind and three-layer non-oriented film was evaluated and the result is shown in Table 9 which will be mentioned later.

Comparative Examples 23–25

The same operation as mentioned in Examples 27 through 34 was carried out except that the propylene block copolymer compositions (BC-41 to BC-43) shown in Table 8 were used as the materials to be used for the core layer to give two-kind and three-layer non-oriented films.

The resulting two-kind and three-layer non-oriented films were evaluated and the result is shown in Table 10 which will be mentioned later.

Examples 35–39

As the materials to be used for the core layer, 99.79% by weight of a propylene block copolymer composition shown in Table 7 (BC-33 to BC-37), 0.03% by weight of tetrakis [methylene(3,5-di-tert-butyl-4-hydroxyphenyl) propionate] methane, 0.08% by weight of tris(2,4-di-tert-butylphenyl) phosphite and 0.1% by weight of calcium stearate were mixed in a Henshel mixer (trade name) and fused and kneaded at 200° C. using a single screw extruder (diameter: 40 mmø) to make into pellets. In the meanwhile, as the materials to be used for the skin layer, 99.79% by weight of apropylene polymer (PP-2; a propylene-ethylene copolymer having a density of 0.90 g/cm³, melting point of the crystals of 150° C. and MFR of 6.0 g/10 minutes: content of ethylene=2.5% by weight), 0.03% of tetrakis[methylene(3,5-di-tert-butyl-4-hydroxyphenyl) propionate]methane, 0.08% by weight of tris(2,4-di-tert-butylphenyl)phosphite and 0.1% by weight of calcium stearate were mixed in a Henshel mixer (trade name) and fused and kneaded at 200° C. using a single screw extruder (diameter: 40 mmø) to make into pellets.

Three-kind and three-layer extruders equipped with a multi-layered T die (one single screw extruder having a diameter of 65 mmø and two single screw extruders having a diameter of 50 mmø) were used and each of the pellet (AA) comprising the above-mentioned propylene copolymer composition and additives and the pellet (BB) comprising the propylene polymer and the additives were supplied to each extruder, fused at 230° C., co-extruded and cooled and solidified with an air chamber and a cooling roll having a surface temperature of 30° C. to give a two-kind and three-layer non-oriented film having a thickness of 70 μm and comprising (skin layer)/ (core layer)/(skin layer)=(BB)/ (AA)/(BB) (thickness constituting ratio=1/4/1).

The resulting two-kind and three-layer non-oriented film was evaluated and the result is shown in Table 11 which will be mentioned later.

Comparative Examples 26–28

The same operation as mentioned in Examples 35–39 was carried out except that the propylene block copolymer compositions (BC-41 to BC-43) shown in Table 8 were used as the materials to be used for the core layer to give two-kind and three-layer non-oriented films.

The resulting two-kind and three-layer non-oriented films were evaluated and the result is shown in Table 11 which will be mentioned later.

Examples 40–42

As the materials to be used for the core layer, 99.79% by weight of a propylene block copolymer composition shown in Table 7 (BC-33), 0.03% by weight of tetrakis[methylene (3,5-di-tert-butyl-4-hydroxyphenyl) propionate]methane, 0.08% by weight of tris(2,4-di-tert-butylphenyl)phosphite and 0.1% by weight of calcium stearate were mixed in a Henshel mixer (trade name) and fused and kneaded at 200° C. using a uniaxial extruder (diameter: 40 mmø) to make into pellets. In the meanwhile, as the materials to be used for the skin layer, 99.79% by weight of a propylene polymer (PP-1), 0.03% of tetrakis[methylene(3,5-di-tert-butyl-4-hydroxyphenyl)propionate]methane, 0.08% by weight of tris(2,4-di-tert-butylphenyl)phosphite and 0.1% by weight of calcium stearate were mixed in a Henshel mixer (trade name) and fused and kneaded at 200° C. using a single screw extruder (diameter: 40 mmø) to make into pellets.

Three-kind and three-layer extruders equipped with a multi-layered T die (one single screw extruder having a diameter of 65 mmø and two single screw extruders having a diameter of 50 mmø) were used and each of the pellet (AA) comprising the above-mentioned propylene copolymer composition and additives and the pellet (BB) comprising the propylene polymer and the additives were supplied to each extruder, fused at 230° C., co-extruded and cooled and solidified with an air chamber and a cooling roll having a surface temperature of 30° C. to give a two-kind and three-layer non-oriented film having a thickness of 70 μm and comprising (skin layer)/(core layer)/(skin layer)=(BB)/(AA)/(BB).

The resulting two-kind and three-layer non-oriented film was evaluated and the result is shown in Table 12 which will be mentioned later.

Comparative Examples 29 and 30

The same operation as mentioned in Examples 40–42 was carried out except that the propylene block copolymer composition (BC-41) shown in Table 8 were used as the materials to be used for the core layer to give a two-kind and three-layer non-oriented films.

The resulting two-kind and three-layer non-oriented films were evaluated and the result is shown in Table 12 which will be mentioned later.

TABLE 1

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Polypropylene Composition | BC-1 | BC-2 | BC-3 | BC-4 | BC-5 | BC-6 | BC-7 | BC-8 | BC-9 |
| Crystalline Polypropylene |  |  |  |  |  |  |  |  |  |
| Limiting Viscosity $[\eta]_{PP}$ [dl/g] | 1.8 | 1.8 | 1.8 | 1.8 | 2.3 | 1.8 | 1.8 | 1.8 | 1.8 |
| Propylene Content [wt %] | 97 | 97 | 97 | 97 | 97 | 97 | 97 | 97 | 95 |
| Ethylene-Propylene Copolymer |  |  |  |  |  |  |  |  |  |
| Limiting Viscosity $[\eta]_{RC}$ [dl/g] | 1.8 | 1.8 | 1.8 | 1.8 | 1.5 | 2.1 | 1.8 | 1.8 | 1.8 |
| Ethylene Content [wt %] | 36 | 36 | 36 | 36 | 36 | 36 | 25 | 42 | 36 |
| Whole Composition |  |  |  |  |  |  |  |  |  |
| $[\eta]_{RC}/[\eta]_{PP}$ | 1.0 | 1.0 | 1.0 | 1.0 | 0.65 | 1.2 | 1.0 | 1.0 | 1.0 |
| $W_{PP}/W_{RC}$ | 1.0 | 2.0 | 3.0 | 4.0 | 2.0 | 2.0 | 2.0 | 2.0 | 3.0 |
| $([\eta]_{RC}/[\eta]_{PP}) \times W_{PP}/W_{RC}$ | 1.0 | 2.0 | 3.0 | 4.0 | 1.3 | 2.4 | 2.0 | 2.0 | 3.0 |
| $[MFR]_{WHOLE}$ [g/10 minutes] | 5.9 | 6.0 | 6.2 | 6.3 | 3.4 | 4.4 | 6.1 | 6.2 | 6.0 |
| Transparency (Haze) [%] | 4.3 | 4.3 | 4.2 | 4.2 | 4.9 | 4.8 | 4.0 | 5.4 | 3.9 |
| Impact Resist. at Low Temp. [° C.] | −35 | −25 | −20 | −10 | −20 | −20 | −10 | −20 | −25 |
| Heat Sealing Temperature [° C.] | 140 | 140 | 140 | 140 | 140 | 140 | 140 | 140 | 130 |
| Preventing Effect for Transparency after Heating ΔHaze [%] | 1.8 | 1.8 | 1.9 | 2.0 | 2.1 | 2.0 | 2.1 | 1.9 | 1.8 |
| Little Whitening property upon bending | oo | oo | oo | oo | oo | oo | Oo | oo | Oo |

TABLE 2

|  | CE 1 | CE 2 | CE 3 | CE 4 | CE 5 | CE 6 | CE 7 |
|---|---|---|---|---|---|---|---|
| Polypropylene Composition | BC-10 | BC-11 | BC-12 | BC-13 | BC-14 | BC-15 | BC16 |
| Crystalline Polypropylene |  |  |  |  |  |  |  |
| Limiting Viscosity $[\eta]_{PP}$ [dl/g] | 6.7 | 1.8 | 2.6 | 1.4 | 1.8 | 1.8 | 1.8 |
| Propylene Content [wt %] | 100 | 97 | 97 | 97 | 100 | 97 | 97 |
| Ethylene-Propylene Copolymer |  |  |  |  |  |  |  |
| Limiting Viscosity $[\eta]_{RC}$ [dl/g] | 1.8 | 1.8 | 1.4 | 2.8 | 1.8 | 1.8 | 1.8 |
| Ethylene Content [wt %] | 36 | 36 | 36 | 36 | 25 | 20 | 64 |
| Total Composition |  |  |  |  |  |  |  |
| $[\eta]_{RC}/[\eta]_{PP}$ | 0.26 | 1.0 | 0.54 | 2.0 | 1.0 | 1.0 | 1.0 |
| $W_{PP}/W_{RC}$ | 2.0 | 5.7 | 2.0 | 2.0 | 2.0 | 2.0 | 3.0 |
| $([\eta]_{RC}/[\eta]_{PP}) \times W_{PP}/W_{RC}$ | 0.26 | 5.7 | 1.1 | 4.0 | 2.0 | 2.0 | 3.0 |
| $[MFR]_{WHOLE}$ [g/10 minutes] | 0.08 | 5.9 | 2.6 | 6.3 | 6.1 | 6.2 | 6.3 |
| Transparency (Haze) [%] | Film formation Impossible | 4.1 | 5.4 | 13.3 | 5.1 | 4.7 | 80 |
| Impact Resist. at Low Temp. [° C.] |  | −10 | 0 | −20 | −20 | 0 | −35 |
| Heat Sealing Temperature [° C.] |  | 140 | 140 | 140 | 155 | 140 | 140 |
| Preventing Effect for Transparency after Heating ΔHaze [%] |  | 6.5 | 5.6 | 5.8 | 2.9 | 4.2 | 3.9 |
| Little Whitening property upon bending |  | x | x | x | o | o | x |

(CE: Comparative Example)

TABLE 3

|  | Ex. 10 | Ex. 11 | Ex. 12 | Ex. 13 | CE 8 | CE 9 | CE 10 | CE 11 |
|---|---|---|---|---|---|---|---|---|
| Surface Layer 1 | BC-1 | RPP | BC-2 | RPP | BC-11 | RPP | BC-16 | RPP |
| Middle Layer | RPP | BC-1 | RPP | BC-2 | RPP | BC-11 | RPP | BC-16 |
| Surface Layer 2 | BC-1 | RPP | BC-2 | RPP | BC-11 | RPP | BC-16 | RPP |
| Transparency (Haze) [%] | 4.1 | 3.7 | 4.2 | 3.6 | 4.0 | 3.7 | 75 | 19.4 |
| Impact resistance at Low Temp [° C.] | −30 | −20 | −20 | −10 | −5 | 0 | −30 | −20 |
| Heat Sealing Temperature [° C.] | 140 | 135 | 140 | 135 | 140 | 135 | 140 | 135 |
| Preventing Effect for Transparency after Heating ΔHaze [%] | 2.2 | 2.9 | 2.1 | 3.0 | 6.9 | 8.4 | 4.3 | 5.2 |
| Little Whitening property upon bending | Oo | o | oo | o | x | x | x | x |

TABLE 4

|  | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|
| Polypropylene Composition | BC-17 | BC-18 | BC-19 | BC-20 | BC-21 | BC-22 | BC-23 | BC-24 | BC-25 |
| Crystalline Polypropylene |  |  |  |  |  |  |  |  |  |
| Limiting Viscosity $[\eta]_{PP}$ [dl/g] | 1.8 | 1.8 | 1.8 | 1.8 | 2.3 | 1.8 | 1.8 | 1.8 | 1.8 |
| Propylene Content [wt %] | 97 | 97 | 97 | 97 | 97 | 97 | 97 | 97 | 95 |
| Ethylene-Propylene Copolymer |  |  |  |  |  |  |  |  |  |
| Limiting Viscosity $[\eta]_{RC}$ [dl/g] | 1.8 | 1.8 | 1.8 | 1.8 | 1.5 | 2.1 | 1.8 | 1.8 | 1.8 |
| Ethylene Content [wt %] | 36 | 36 | 36 | 36 | 36 | 36 | 25 | 42 | 36 |
| Total Composition |  |  |  |  |  |  |  |  |  |
| $[\eta]_{RC}/[\eta]_{PP}$ | 1.0 | 1.0 | 1.0 | 1.0 | 0.65 | 1.2 | 1.0 | 1.0 | 1.0 |
| $W_{PP}/W_{RC}$ | 1.0 | 2.0 | 3.0 | 4.0 | 2.0 | 2.0 | 2.0 | 2.0 | 3.0 |
| $([\eta]_{RC}/[\eta]_{PP}) \times W_{PP}/W_{RC}$ | 1.0 | 2.0 | 3.0 | 4.0 | 1.3 | 2.4 | 2.0 | 2.0 | 3.0 |
| $[MFR]_{WHOLE}$ [g/10 minutes] | 5.9 | 6.0 | 6.2 | 6.3 | 3.4 | 4.4 | 6.1 | 6.2 | 6.0 |
| Transparency (Haze) [%] | 1.9 | 2.0 | 2.0 | 2.3 | 2.2 | 2.6 | 2.0 | 3.0 | 1.5 |
| Impact Resist. at Low Temp. [° C.] | −35 | −25 | −20 | −10 | −20 | −20 | −10 | −20 | −25 |
| Heat Sealing Temperature [° C.] | 140 | 140 | 140 | 140 | 140 | 140 | 140 | 140 | 130 |
| Self-Tackiness | oo | oo | oo | oo | oo | oo | oo | oo | oo |

TABLE 5

|  | CE 12 | CE 13 | CE 14 | CE 15 | CE 16 | CE 17 | CE 18 |
|---|---|---|---|---|---|---|---|
| Polypropylene Composition | BC-26 | BC-27 | BC-28 | BC-29 | BC-30 | BC-31 | BC-32 |
| Crystalline Polypropylene |  |  |  |  |  |  |  |
| Limiting Viscosity $[\eta]_{PP}$ [dl/g] | 6.8 | 1.8 | 2.6 | 1.4 | 1.8 | 1.8 | 1.8 |
| Propylene Content [wt %] | 100 | 97 | 97 | 97 | 100 | 97 | 97 |
| Ethylene-Propylene Copolymer |  |  |  |  |  |  |  |
| Limiting Viscosity $[\eta]_{RC}$ [dl/g] | 1.8 | 1.8 | 1.4 | 2.8 | 1.8 | 1.8 | 1.8 |
| Ethylene Content [wt %] | 36 | 36 | 36 | 36 | 25 | 20 | 64 |
| Total Composition |  |  |  |  |  |  |  |
| $[\eta]_{RC}/[\eta]_{PP}$ | 0.26 | 1.0 | 0.54 | 2.0 | 1.0 | 1.0 | 1.0 |
| $W_{PP}/W_{RC}$ | 2.0 | 5.7 | 2.0 | 2.0 | 2.0 | 2.0 | 3.0 |
| $([\eta]_{RC}/[\eta]_{PP}) \times W_{PP}/W_{RC}$ | 0.26 | 5.7 | 1.1 | 4.0 | 2.0 | 2.0 | 3.0 |
| $[MFR]_{WHOLE}$ [g/10 minutes] | 0.08 | 5.9 | 2.6 | 6.3 | 6.1 | 6.2 | 6.3 |
| Transparency (Haze) [%] | film formation impossible | 2.0 | 3.0 | 10.3 | 2.0 | 1.9 | 75 |
| Impact Resist. at Low Temp. [° C.] | film formation impossible | −10 | 0 | −20 | −20 | 0 | −35 |
| Heat Sealing Temperature [° C.] | film formation impossible | 140 | 140 | 140 | 155 | 140 | 140 |
| Self-Tackiness |  | x | x | x | o | o | x |

TABLE 6

|  | Ex. 23 | Ex. 24 | Ex. 25 | Ex. 26 | CE. 19 | CE. 20 | CE. 21 | CE. 22 |
|---|---|---|---|---|---|---|---|---|
| Skin Layer 1 | BC-18 | BC-18 | BC-18 | BC-18 | BC-27 | BC-27 | BC-27 | BC-27 |
| Core Layer | LLDPE | LLDPE | RPP | RPP | LLDPE | LLDPE | RPP | PRR |
| Skin Layer 2 | BC-18 | LLDPE | BC-18 | RPP | BC-27 | LLDPE | BC-27 | RPP |
| Transparency (Haze) [%] | 2.2 | 2.0 | 2.1 | 2.0 | 2.1 | 2.0 | 1.9 | 2 |
| Impact Resist. at Low Temp [° C.] | −30 | −30 | −15 | −15 | −30 | −30 | 0 | 0 |
| Heat Sealing Temperature [° C.] | 140 | 140 | 140 | 140 | 140 | 140 | 140 | 140 |
| Self-Tackiness | Oo | o | oo | o | x | x | x | x |

TABLE 7

Propylene Block Copolymer Composition (a)

|  | BC-33 | BC-34 | BC-35 | BC-36 | BC-37 | BC-38 | BC-39 | BC-40 |
|---|---|---|---|---|---|---|---|---|
| <Homopolymer Composition> | | | | | | | | |
| Content $W_{PP}$ [wt %] | 70.8 | 70.3 | 71.1 | 75.0 | 62.2 | 69.7 | 68.9 | 72.3 |
| Limiting Viscosity $[\eta]_{PP}$ [dl/g] | 2.05 | 1.85 | 2.05 | 1.90 | 1.85 | 2.00 | 1.80 | 1.80 |
| Isotactic Pentad Fraction P [–] | 0.968 | 0.969 | 0.970 | 0.971 | 0.967 | 0.970 | 0.969 | 0.955 |
| $MFR_{PP}$ [g/10 minutes] | 2.8 | 4.5 | 2.8 | 3.2 | 4.5 | 3.5 | 3.0 | 3.0 |
| <Copolymer Components of Ethylene-Propylene> | | | | | | | | |
| Content $W_{RC}$ [wt %] | 29.2 | 29.7 | 28.9 | 25.0 | 37.8 | 30.3 | 31.1 | 27.7 |
| Ethylene Content [wt %] | 34 | 35 | 35 | 36 | 33 | 2.8 | 41 | 36 |
| Limiting Viscosity $[\eta]_{RC}$ [dl/g] | 2.0 | 1.85 | 1.90 | 1.85 | 1.85 | 2.30 | 1.80 | 1.80 |
| $MFR_{RC}$ [g/10 minutes] | 3.5 | 4.0 | 2.8 | 4.0 | 4.2 | 1.5 | 4.5 | 4.5 |
| $CXS_{RC}$ [wt %] | 86 | 89 | 90 | 87 | 88 | 92 | 86 | 87 |
| <Whole> | | | | | | | | |
| $W_{PP}/W_{RC}$ [–] | 2.42 | 2.37 | 2.46 | 3.00 | 1.65 | 2.30 | 2.22 | 2.61 |
| $[\eta]_{RC}/[\eta]_{PP}$ [–] | 0.98 | 1.00 | 0.93 | 0.97 | 1.00 | 1.15 | 1.00 | 1.00 |
| $([\eta]_{RC}/[\eta]_{PP}) \times (W_{PP}/W_{RC})$ [–] | 2.37 | 2.37 | 2.29 | 2.91 | 1.65 | 2.65 | 2.22 | 2.61 |
| $MFR_{WHOLE}$ [g/10 minutes] | 3.2 | 4.2 | 2.8 | 3.5 | 4.3 | 2.8 | 3.8 | 3.8 |
| $M_w/M_n$ [–] | 4.2 | 4.2 | 4.2 | 4.2 | 4.2 | 4.2 | 4.2 | 4.2 |

TABLE 8

Propylene Block Copolymer Composition (a) (continued)

|  | BC-41 | BC-42 | BC-43 |
|---|---|---|---|
| <Homopolymer Composition> | | | |
| Content $W_{PP}$ [wt %] | 70.8 | 69.5 | 82.4 |
| Limiting Viscosity $[\eta]_{PP}$ [dl/g] | 1.40 | 2.30 | 1.80 |
| Isotactic Pentad Fraction P [–] | 0.971 | 0.968 | 0.968 |
| $MFR_{PP}$ [g/10 minutes] | 34.0 | 1.5 | 6.2 |
| <Copolymer Components of Ethylene-Propylene> | | | |
| Content $W_{RC}$ [wt %] | 29.2 | 30.5 | 17.7 |
| Ethylene Content [wt %] | 36 | 36 | 34 |
| Limiting Viscosity $[\eta]_{RC}$ [dl/g] | 2.95 | 1.40 | 1.80 |
| $MFR_{RC}$ [g/10 minutes] | 0.32 | 27.3 | 5.9 |
| $CXS_{RC}$ [wt %] | 85 | 89 | 90 |
| <Whole> | | | |
| $W_{PP}/W_{RC}$ [–] | 2.42 | 2.28 | 4.66 |
| $[\eta]_{RC}/[\eta]_{PP}$ [–] | 2.10 | 0.61 | 1.00 |
| $([\eta]_{RC}/[\eta]_{PP}) \times (W_{PP}/W_{RC})$ [–] | 5.01 | 1.39 | 4.66 |
| $MFR_{WHOLE}$ [g/10 minutes] | 4.8 | 3.0 | 6.2 |
| $M_w/M_n$ [–] | 6.2 | 5.5 | 4.2 |

TABLE 9

Physical Properties of Multi-Layered Film

|  | Ex. 27 | Ex. 28 | Ex. 29 | Ex. 30 | Ex. 31 | Ex. 32 | Ex. 33 | Ex. 34 |
|---|---|---|---|---|---|---|---|---|
| <Core Layer> | | | | | | | | |
| Block Copolymer Composition | BC-33 | BC-34 | BC-35 | BC-36 | BC-37 | BC-38 | BC-39 | BC-40 |
| <Skin Layer> | | | | | | | | |
| Propylene Polymer | PP-1 | PP-1 | PP-1 | PP-1 | PP-1 | PP-1 | PP-1 | PP-1 |
| <Phys. Prop. of Multi-Layered Film> | | | | | | | | |
| MFR of Film (g/10 minutes) | 3.9 | 4.8 | 3.5 | 4.3 | 4.9 | 3.5 | 4.4 | 4.4 |
| Transparency (Haze) [%] | 12.5 | 11.6 | 13.8 | 11.2 | 14.5 | 14.3 | 14.7 | 12.5 |
| Impact Resist. at Low Temp. (C.) [J] | 0.83 | 0.85 | 0.79 | 0.68 | 1.02 | 0.98 | 0.99 | 0.8 |
| Heat Resistance [° C.] | 152 | 151 | 155 | 158 | 148 | 151 | 150 | 155 |
| Sealing Strength (N/15 mm) | 1.82 | 1.88 | 1.85 | 1.86 | 1.88 | 1.85 | 1.78 | 1.89 |
| Haze Differ. before and after High-Temp Sterilization Treatment (Haze/after)–(Haze/before) (%) | 2.5 | 2.4 | 2.3 | 2.5 | 2.2 | 2.5 | 2.2 | 2.5 |

TABLE 10

Physical Properties of Multi-Layered Film
(continued)

|  | Comp.Ex.23 | Comp. Ex.24 | Comp. Ex.25 |
|---|---|---|---|
| <Core Layer> | | | |
| Block Copolymer Composition | BC-41 | BC-42 | BC-43 |
| <Skin Layer> | | | |
| Propylene Polymer | PP-1 | PP-1 | PP-1 |
| <Phys. Prop. of Multi-Layered Film> | | | |
| MFR of Film (g/10 minutes) | 5.8 | 4.4 | 7.5 |
| Transparency (Haze) [%] | 21.0 | 25.8 | 10.1 |
| Impact Resist. at Low Temp.(° C.)[J] | 0.82 | 0.89 | 0.31 |
| Heat Resistance [° C.] | 152 | 151 | 160 |
| Sealing Strength (N/15 mm) | 1.48 | 1.82 | 1.39 |
| Haze Differ. before and after High-Temp Sterilization Treatment (Haze/after)-(Haze/before)(%) | 8.5 | 10.1 | 2.0 |

TABLE 11

(Physical Properties of Multi-Layered Film)

|  | Ex. 35 | Ex. 36 | Ex. 37 | Ex. 37 | Ex. 38 | CE. 26 | CE. 27 | CE. 28 |
|---|---|---|---|---|---|---|---|---|
| <Core Layer> | | | | | | | | |
| Block Copolymer Composition | BC-33 | BC-34 | BC-35 | BC-36 | BC-37 | BC-41 | BC-42 | BC-43 |
| <Skin Layer> | | | | | | | | |
| Propylene Polymer | PP-2 | PP-2 | PP-2 | PP-2 | PP-2 | PP-2 | PP-2 | PP-2 |
| <Phys. Prop. of Multi-Layered Film> | | | | | | | | |
| MFR of Film (g/10 minutes) | 3.4 | 4.4 | 3.2 | 4.1 | 4.4 | 5.6 | 4.2 | 7.5 |
| Transparency (Haze) [%] | 10.5 | 9.8 | 11.2 | 9.6 | 10.8 | 14.5 | 22.8 | 8.5 |
| Impact Resist. at Low Temp. (C.) [J] | 0.94 | 0.99 | 0.65 | 0.51 | 1.21 | 0.94 | 0.99 | 0.38 |
| Heat Resistance [° C.] | 147 | 147 | 149 | 151 | 145 | 147 | 147 | 157 |
| Sealing Strength (N/15 mm) | 1.78 | 1.79 | 1.80 | 1.81 | 1.81 | 1.45 | 1.77 | 1.40 |
| Haze Differ. before and after High-Temp Sterilization Treatment (Haze/after)–(Haze/before) (%) | 2.5 | 2.4 | 2.3 | 2.4 | 2.2 | 5.7 | 9.8 | 1.9 |

TABLE 12

(Physical Properties of Multi-Layered Film)

|  | Ex. 40 | Ex. 41 | Ex. 42 | CE. 29 | CE. 30 |
|---|---|---|---|---|---|
| <Core Layer> | | | | | |
| Propylene Block Copolymer Composition | BC-33 | BC-33 | BC-33 | BC-44 | BC-44 |
| <Skin Layer> | | | | | |
| Propylene Polymer | PP-1 | PP-1 | PP-1 | PP-1 | PP-1 |
| Layer-Constituting Ratio (Thickness of Layer A to the Whole Thickness) (%) | 70 | 50 | 20 | 10 | 90 |
| Thickness of Each Layer (Skin Layer:Core Layer:Skin Layer) (μm) | 10:50:10 | 18:34:18 | 15:40:15 | 31.5:7:31.5 | 3:64:3 |
| <Physical Properties of Multi-Layered Film> | | | | | |
| MFR of Film (g/10 minutes) | 3.9 | 3.9 | 4.8 | 4.8 | 4.9 |
| Transparency (Haze) [%] | 12.5 | 10.5 | 6.5 | 19.5 | 28.8 |
| Impact resistance at Low Temp. (° C.) [J] | 0.83 | 0.64 | 0.51 | 0.35 | 3.25 |
| Heat Resistance [° C.] | 152 | 153 | 159 | 159 | 149 |
| Sealing Strength (N/15 mm) | 1.82 | 1.85 | 1.85 | 1.85 | 1.84 |
| Haze Differ. before and after High-Temp Sterilization Treatment (Haze/after)–(Haze/before) (%) | 2.5 | 2.0 | 0.8 | 5.5 | 10.8 |

Industrial Applicability

The film according to claims 1 to 7 of the present invention has excellent transparency, impact resistance at low temperature and heat sealing property and also has self-tackiness, little whitening property upon bending and preventive effect of lowering the transparency after heating treatment. In addition, the multi-layered film thereof achieves advantages of transparency, heat resistance, impact resistance at low temperature, heat sealing property, self-tackiness, little whitening property upon bending and preventive effect for lowering the transparency after heating treatment. Accordingly, the polypropylene film and the multi-layered film of the present invention can be appropriately used in various uses such as film for retort pouch to be heat sterilization, film for medical use, film for layered package and film for box manufacture. Further, the multi-layered film according to claims 8 to 11 of the present invention is a multi-layered film having well-balanced heat resistance, impact resistance at low temperature, tight sealing of the content and transparency and can be appropriately used as a multi-layered film for high-temperature sterilization package.

What is claimed is:

1. A film using a polypropylene composition comprising a crystalline polypropylene and a copolymer of propylene and α-olefin in which the content of α-olefin is 20 to 55%, where the intrinsic viscosity of the copolymer $[\eta]_{RC}$ is 6.5 dl/g or lower, the ratio $([\eta]_{RC}/[\eta]_{PP})$ of the intrinsic viscosity of the copolymer $[\eta]_{RC}$ to the intrinsic viscosity $[\eta]_{PP}$ of the crystalline polypropylene is 0.6 to 1.2, and the product $([\eta]_{RC}/[\eta]_{PP}) \times (W_{PP}/W_{RC})$ of the weight ratio $W_{PP}/W_{RC}$ and the ratio of the intrinsic viscosity $[\eta]_{RC}/[\eta]_{PP}$ is the range from 0.2 to 4.5, wherein $W_{PP}$ and $W_{RC}$ each represents the weight of the crystalline polypropylene and the copolymer.

2. The film according to claim 1, wherein the crystalline polypropylene is a propylene-α-olefin copolymer containing 90% by weight or more but less than 98.5% by weight or more than 99.5% by weight but less than 100% by weight of propylene.

3. The film according to claim 1, wherein the copolymer is a copolymer of propylene with α-olefin containing from 25% to 55% by weight of α-olefin.

4. The film according to claim 1, wherein the crystalline polypropylene is a propylene-ethylene copolymer containing 90% by weight or more but less than 98.5% by weight or more than 99.5% by weight but less than 100% by weight of propylene.

5. The film according to claim 1, wherein the copolymer is a copolymer of propylene with ethylene containing from 25% to 45% by weight of ethylene.

6. A multi-layered film having at least one layer of a film layer using the polypropylene composition mentioned in claim 1.

7. A self-tacky multi-layered film having at least one layer of the film mentioned in claim 1 as the skin layer.

8. A polypropylene multi-layered film for a high-temperature sterilization package consisting of a three-layered structure in which a film layer using the propylene composition mentioned in claim 1 is a core layer and a film comprising a propylene homopolymer having a crystal melting point of from 160° C. to 165° C. or a propylene-α-olefin copolymer having a crystal melting point of from 145° C. to 160° C. as both skin layers.

9. The polypropylene multi-layered film for a high-temperature sterilization package according to claim 8, wherein the thickness of the core layer of the polypropylene multi-layered film for a high-temperature sterilization package mentioned in the above (8) is from 20% to 80% of the total thickness of the said polypropylene multi-layerd film.

10. The polypropylene multi-layered film for a high-temperature sterilization package according to claim 8, wherein the melt flow rate (MFR, at 230° C.) of the polypropylene multi-layered film for a high-temperature sterilization package is within a range of from 0.5 to 5.0 g/10 minutes.

11. The polypropylene multi-layered film for a high-temperature sterilization package according to claim 8, wherein the difference between the haze value (HAZE/after) of the polypropylene multi-layered film after subjecting to a steam high-temperature sterilization treatment of 120° C. or higher but lower than 140° C. to the haze value (HAZE/before) of the polypropylene multi-layered film before subjecting to the steam high-temperature sterilization treatment is less than 5%.

* * * * *